United States Patent
Suwa

(10) Patent No.: US 11,514,562 B2
(45) Date of Patent: Nov. 29, 2022

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Tetsuya Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 16/789,578

(22) Filed: Feb. 13, 2020

(65) Prior Publication Data
US 2020/0265564 A1 Aug. 20, 2020

(30) Foreign Application Priority Data
Feb. 20, 2019 (JP) .............................. JP2019-028795

(51) Int. Cl.
| | |
|---|---|
| *G06T 5/00* | (2006.01) |
| *G06T 5/50* | (2006.01) |
| *G06T 7/571* | (2017.01) |
| *G06K 15/02* | (2006.01) |
| *H04N 5/232* | (2006.01) |

(52) U.S. Cl.
CPC .......... *G06T 5/009* (2013.01); *G06K 15/1878* (2013.01); *G06T 5/50* (2013.01); *G06T 7/571* (2017.01); *G06T 2207/20021* (2013.01); *G06T 2207/20208* (2013.01); *G06T 2207/20212* (2013.01); *H04N 5/23229* (2013.01)

(58) Field of Classification Search
CPC combination set(s) only.
See application file for complete search history.

(56) References Cited

U.S. PATENT DOCUMENTS

| | | | |
|---|---|---|---|
| 7,343,040 B2 * | 3/2008 | Chanas | H04N 1/00007 |
| | | | 382/172 |
| 7,944,588 B2 | 5/2011 | Yamada et al. | |
| 2006/0192878 A1 * | 8/2006 | Miyahara | H04N 5/2355 |
| | | | 348/333.01 |
| 2008/0085062 A1 * | 4/2008 | Tsuruoka | G06T 5/008 |
| | | | 348/E5.073 |

(Continued)

FOREIGN PATENT DOCUMENTS

| | | | | |
|---|---|---|---|---|
| JP | 2008147777 | * | 6/2008 | ............. G03B 15/00 |
| JP | 5829758 B2 | | 10/2015 | |
| WO | 2013/059116 A1 | | 4/2013 | |

*Primary Examiner* — Zhiyu Lu
(74) *Attorney, Agent, or Firm* — Venable LLP

(57) ABSTRACT

An image processing apparatus including a division unit configured to divide first image data having a first dynamic range into a plurality of regions, an obtaining unit configured to obtain distance information indicating a distance from a focal plane in each of the plurality of regions, a determining unit configured to determine a conversion characteristic of each of the plurality of regions based on the distance information, a conversion unit configured to convert each of the plurality of regions into second image data having a second dynamic range smaller than the first dynamic range by using the conversion characteristic determined by the determining unit, and a storage unit configured to store a first conversion characteristic and a second conversion characteristic that can be used for the conversion.

15 Claims, 8 Drawing Sheets

(56) References Cited

U.S. PATENT DOCUMENTS

| | | | |
|---|---|---|---|
| 2009/0231467 A1* | 9/2009 | Yamashita | H04N 5/243 |
| | | | 348/E9.053 |
| 2013/0294683 A1* | 11/2013 | Yamashita | G06T 5/50 |
| | | | 382/154 |
| 2015/0226541 A1* | 8/2015 | Aoki | H04N 5/23229 |
| | | | 348/140 |
| 2017/0087023 A1* | 3/2017 | Peli | A61F 9/08 |
| 2018/0146135 A1* | 5/2018 | Nakayama | H04N 5/232122 |
| 2018/0176483 A1* | 6/2018 | Knorr | G06T 19/006 |
| 2018/0336670 A1* | 11/2018 | Onuki | G06T 5/007 |
| 2018/0341110 A1* | 11/2018 | Hirata | G02B 27/286 |
| 2019/0335149 A1* | 10/2019 | Hirota | H04N 5/20 |
| 2020/0013149 A1 | 1/2020 | Yazawa et al. | |
| 2022/0164970 A1* | 5/2022 | Andreopoulos | G06N 3/049 |

* cited by examiner

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATION

This application claims the benefit of Japanese Patent Application No. 2019-028795, filed Feb. 20, 2019, which is hereby incorporated by reference herein in its entirety.

BACKGROUND OF THE INVENTION

Field of the Invention

The present invention relates to an image processing apparatus, an image processing method, and a computer-readable medium.

Description of the Related Art

With the popularization of digital cameras, moving images captured by digital cameras are generally viewed on a display apparatus such as a television, or printed by a printer or the like. Here, in the digital camera, not all of the light that we see in the scene that is captured can be acquired. In particular, when the luminance exceeds a predetermined dynamic range (hereafter, referred to as "D range"), a sensor signal of a sensor included in the digital camera is saturated, and the tonality cannot be maintained.

On the other hand, in recent years, HDR (High Dynamic Range) content that has a reproduction range with a wide color gamut and a high luminance and has become widespread. Some HDR content has 1000 nits as the luminance range to be expressed, and BT.2020 as the color gamut. When HDR image data is printed by a printer or the like, it is necessary to suppress image quality degradation in a range conversion from the D range of the HDR content to the D range that can be reproduced by the printer.

Japanese Patent No. 5829758 discusses, in the conversion between input/output data, that an anchor point (reference luminance) substantially equal to a gray level of 20% is used as a tone curve.

When a process for restoring a highlight region of an image is applied, the process does not necessarily function appropriately. A description will be given in detail with reference to FIG. 5A and FIG. 5B. FIG. 5A shows an image in which sparkles of water in the background are captured behind a white bird 501, which is the main subject. Since the background portion of this image is a region deviating from the depth of field, the water surface is in a so-called ball bokeh state in which sparkle is round and white in a circular shape. FIG. 5B is an image obtained by capturing a snowman 503 as a main subject, and this is also an image in which a background portion deviating from the depth of field is subject to bokeh. A snowy mountain and a cloud 504 floating in the sky appear behind the snowman 503, but this is a background that has bokeh because it deviates from the focal position (focal plane). When processing for restoring the highlight region is applied to these images, the highlight region is restored, and for example, it is possible to realize improvement of the reproduction of details of the wings of the white bird 501 and the reproduction of the texture of the snowman 503.

Meanwhile, the highlight of the bokeh region is restored with respect to the ball bokeh portion 502 and the background sky cloud 504. As a result, the ball bokeh portion 502 becomes dull and loses a sparkling feeling, and the cloud 504 simply becomes a flat gray region without detail. That is, in highlight restoration processing for HDR image data described above, there may be a region that is not necessarily suitable for the processing.

SUMMARY OF THE INVENTION

The present invention in one aspect provides an image processing apparatus including a division unit configured to divide first image data having a first dynamic range into a plurality of regions, an obtaining unit configured to obtain distance information indicating a distance from a focal plane in each of the plurality of regions, a determining unit configured to determine a conversion characteristic of each of the plurality of regions based on the distance information, a conversion unit configured to convert each of the plurality of regions into second image data having a second dynamic range smaller than the first dynamic range by using the conversion characteristic determined by the determining unit, and a storage unit configured to store a first conversion characteristic and a second conversion characteristic that can be used for the conversion, wherein, in relation to input luminance and output luminance, the first conversion characteristic has a higher characteristic of maintaining tone than the second conversion characteristic, and has a lower characteristic of maintaining contrast than the second conversion characteristic, wherein, with respect to a first region whose distance from the focal plane indicated by the distance, information is a first distance, the determining unit applies the first conversion characteristic at a first level, and applies the second conversion characteristic at a second level, and wherein with respect to a second region separated from the focal plane indicated by the distance information by a second distance longer than the first distance the determining unit applies the first conversion characteristic at a level lower than the first level, and applies the second conversion characteristic at a level higher than the second level.

According to the present invention, when converting from an input D range to an output D range, it is possible to output an image having a high contrast with respect to a bokeh region while being able to restore the tonality of the main subject portion in focus in the image.

Further features of the present invention will become apparent from the following description of exemplary embodiments (with reference to the attached drawings).

DESCRIPTION OF THE EMBODIMENTS

Figure 1:
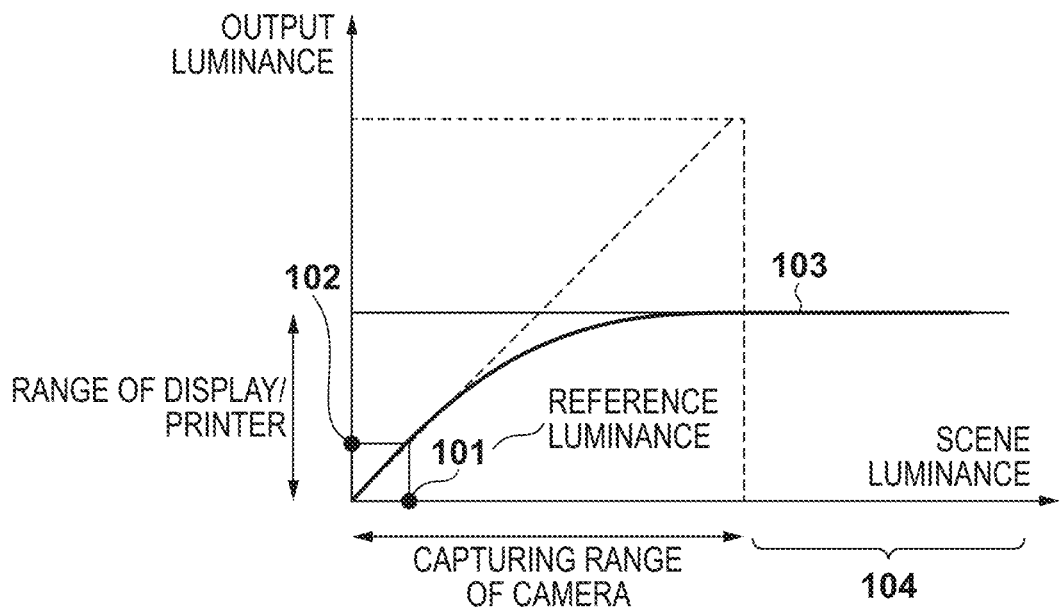
FIG. 1 is a view showing an example of a graph (with a saturation region) representing input and output luminance ranges.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and a redundant description thereof is omitted.

[Luminance Conversion]

FIG. 1 is a diagram for describing a change in luminance according to D ranges of an input apparatus and an output apparatus. Here, a description is given by assuming that the input apparatus is a digital camera, and the output apparatus is a printer. In FIG. 1, the horizontal axis represents a luminance of a scene, and the vertical axis represents output luminance. The digital camera uses a photometric function provided in the apparatus to relatively determine the luminance so that the reference luminance 101 becomes a predetermined output value 102. In relation to output luminance, there are cases where the D range of a display or a printer is narrower than that of a digital camera or the like. Therefore, for example, a gamma correction, which has the characteristic as shown by a curve 103 and corresponds to the output range of a printer, or the like, which is narrower than the capturing range of the digital camera, is applied. In the case of the example of FIG. 1, for an area of high luminance as shown by a luminance range 104 of the scene, an image that includes a region of overexposure in which the signal is saturated is output. When the D range of the input and the D range of the output are the same, as shown by the broken line in FIG. 1, the input value and the output value are the same, and, therefore, overexposure, or the like1, does not occur.

Figure 2:
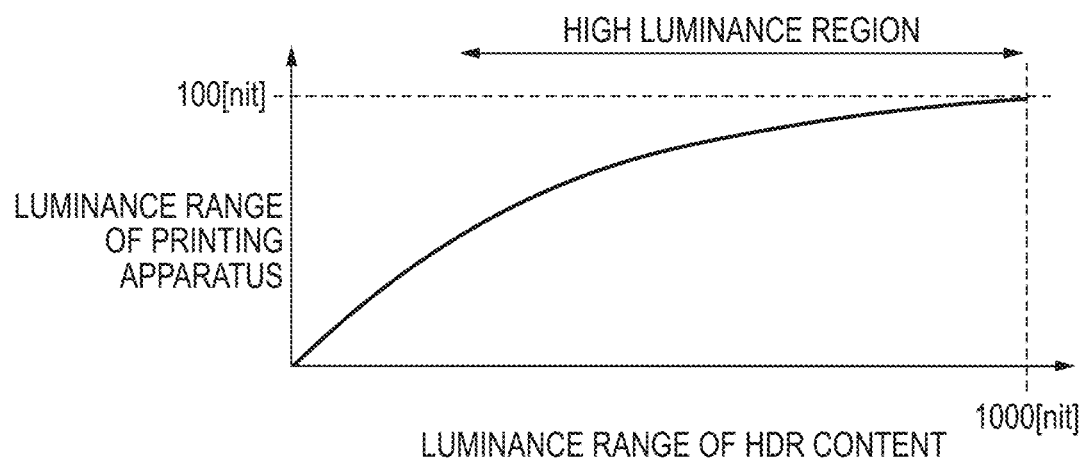
FIG. 2 is a view showing an example of a graph (with no saturation region) representing input and output luminance ranges.

FIG. 2 is a diagram showing an example of performing D range compression by minimizing a region in which an image is saturated. Here, an example of a conversion curve is shown in a case when the luminance range of the HDR content as an input is 1000 [nit] and the luminance range of a printing apparatus as an output is 100 [nit]. In FIG. 2, the horizontal axis represents the luminance value (input value) in the D range of the HDR content, and the vertical axis represents the luminance value (output value) in the D range of the printing apparatus. In the case of the example shown in FIG. 2, a conversion is performed so that, even in a region of high luminance, a region of overexposure by the signal being saturated does not occur.

[Hardware Configuration]

Figure 3:
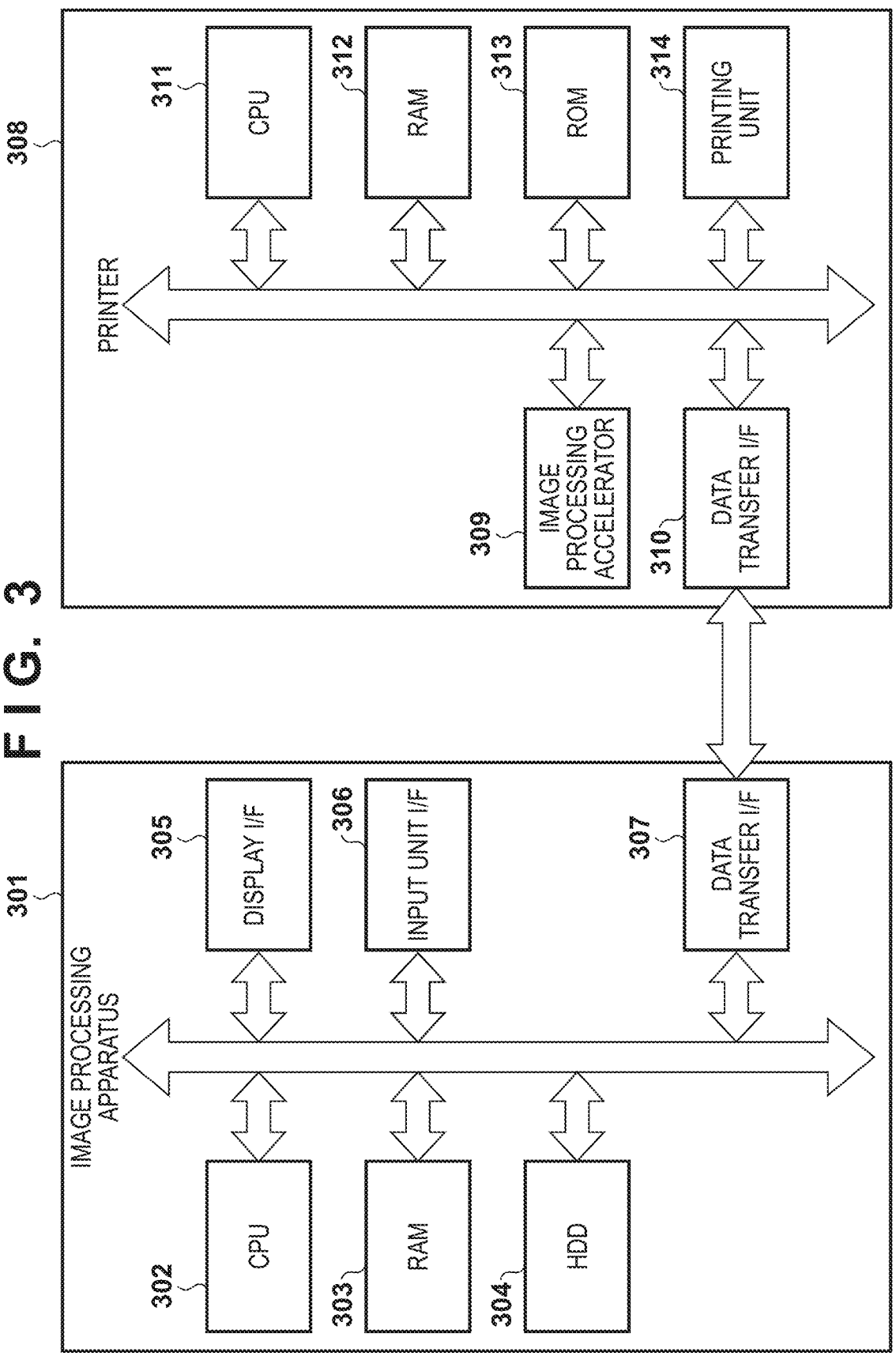
FIG. 3 is a diagram showing an example of a hardware configuration of an image processing system according to an embodiment of the present invention.

FIG. 3 is a diagram showing an example of a hardware configuration of a system to which the present invention can be applied. In the present embodiment, the system is configured by including an image processing apparatus 301 as a host PC and a printer 308 as an image forming apparatus. The image processing apparatus 301 is configured by including a CPU (Central Processing Unit) 302, a RAM (Random Access Memory) 303, an HDD (Hard Disc Drive) 304, a display I/F (interface) 305, an input unit I/F 306, and a data transfer I/F 307. The CPU 302 executes various processes while using the RAM 303 as a work area in accordance with programs held in the HDD 304. For example, the CPU 302 generates image data that can be printed by the printer 308 in accordance with a command received from a user via the input unit I/F 306 and programs stored in the HDD 304. Then, the CPU 302 transfers the generated image data to the printer 308. Further, the CPU 302 performs predetermined processing on image data received from the printer 308 via the data transfer I/F 307 in accordance with programs stored in the HDD 304. The results and various pieces of information are displayed on a display (not shown) via the display I/F 305. In the image processing apparatus 301, the respective units are connected so as to be able to communicate with each other.

The printer 308 is configured by including a CPU 311, a RAM 312, a ROM 313, an image processing accelerator 309, a data transfer I/F 310, and a printing unit 314. The CPU 311 executes various processes while using the RAM 312 as a work area in accordance with programs held in the ROM 313. The image processing accelerator 309 is hardware capable of executing image processing faster than the CPU 311. The image processing accelerator 309, which is activated when the CPU 311 writes parameters and data required for image processing to predetermined addresses of the RAM 312, reads the parameters and data, and then executes predetermined image processing on the data. Note that the image processing accelerator 309 is not an indispensable element, and a configuration may be taken such that the same processing is executed by the CPU 311, and the image processing accelerator 309 is omitted. The printing unit 314 performs printing processing on a print medium based on the image data processed by the CPU 311 or the image processing accelerator 309. The printing unit 314 can perform printing by an inkjet method, for example, but may be configured to perform printing by another method.

As a connection method in the data transfer I/F 307 of the image processing apparatus 301 and the data transfer I/F 310 of the printer 308, USB, IEEE 1394, a wired LAN, a wireless LAN, or the like, can be used, but the connection method is not limited thereto. Further, in the case of the example shown in FIG. 3, illustration was given of an example in which the system is provided with the image processing apparatus 301 and the printer 308 as different apparatuses, but these may be realized by a single apparatus.

[Description of Overall Image Processing]

Hereafter, contrast correction processing according to the present embodiment will be described in detail. The contrast correction processing according to the present embodiment is processing for performing predetermined image processing when the HDR image data is to be printed by the printer 308.

Figure 4:
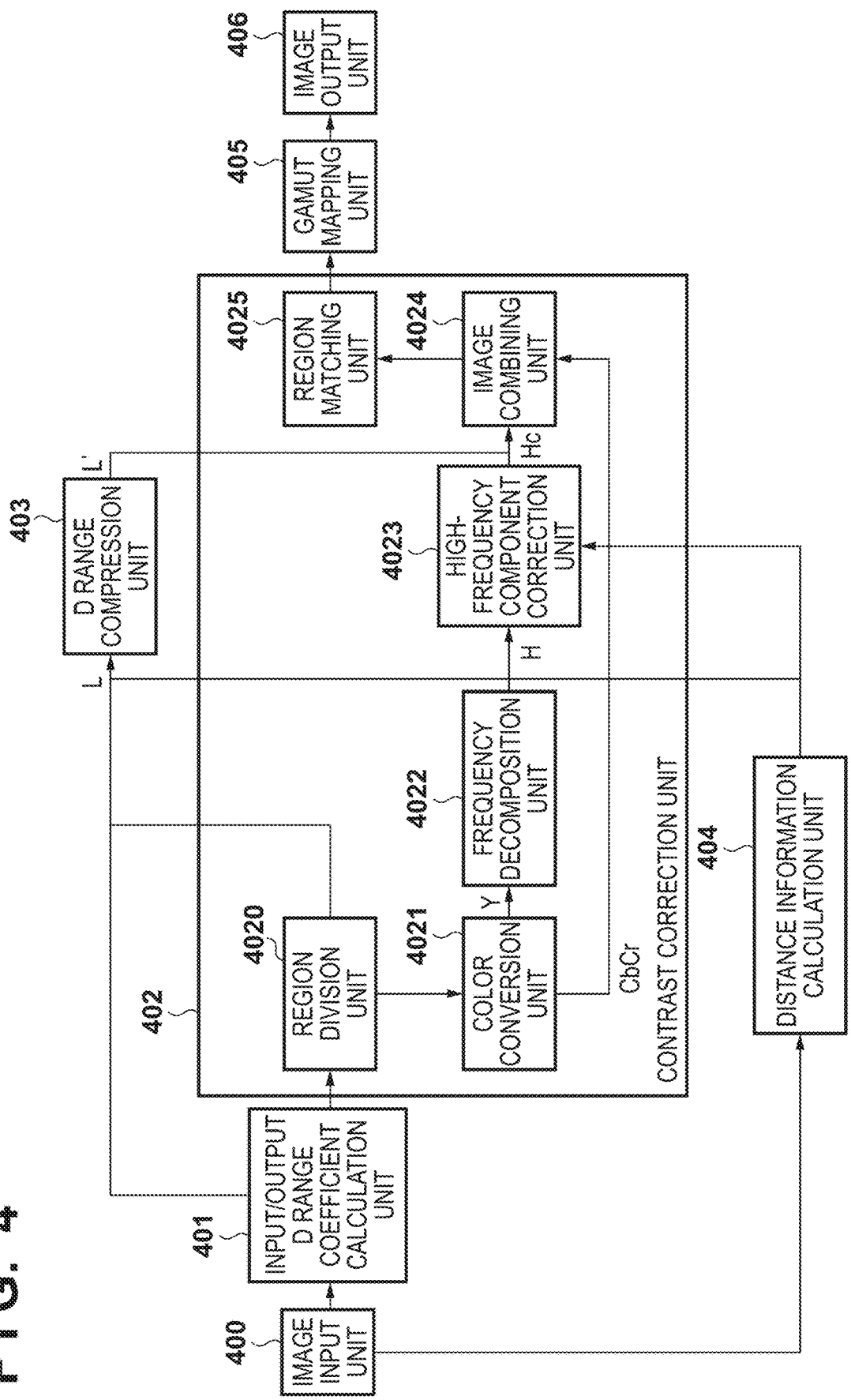
FIG. 4 is a diagram showing an example of a software configuration of an image processing unit according to an embodiment of the present invention.
Figure 5A:
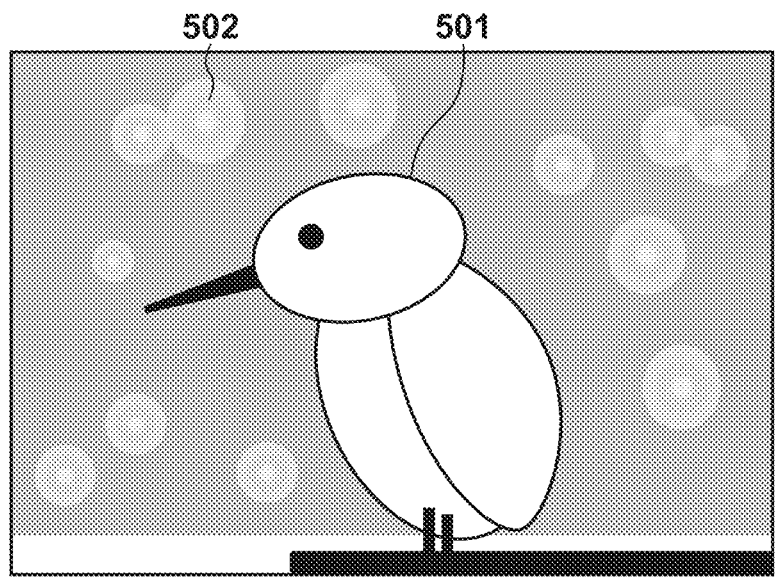
FIGS. 5A and 5B are diagrams for describing the problem of the present invention.
Figure 5B:
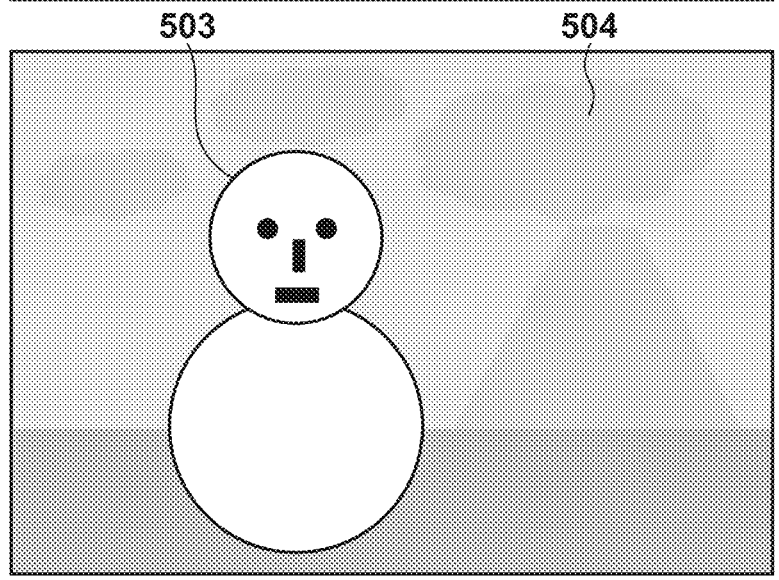

FIG. 4 is a diagram showing an example of a software configuration for describing image processing when HDR image data is printed by the printer 308. An image input unit 400 obtains HDR image data. In the present embodiment, a description is given by an example in which the HDR image data has a luminance range of 1000 nit, and its color gamut is RGB data of BT.2020. The HDR image data is image data captured by a digital camera, and may be directly obtained from the digital camera or may be obtained via a network. In addition to the HDR image data, the image input unit 400 also obtains capturing information from when the HDR image data is captured. The capturing information includes information such as a shutter speed, an exposure period, a lens aperture value, an ISO sensitivity, and a dynamic range at the time of capturing. In addition, information such as distance information of the subject, a white balance, a focal length, and a photometric method may be obtained.

An input/output D range calculation unit 401 calculates an input/output D range coefficient k based on of each of the input D range and the output D range. The input D range is calculated on the basis of various types of information added to the HDR image data obtained by the image input unit 400, such as the characteristics and exposure conditions of a sensor at the time of capturing, and a white balance setting. The output D range is determined based on the D range of the printer 308 that performs printing. It should be noted that the output D range here may further take into consideration not only the type of sheet used for printing, but also a viewing environment in which printed matter is observed (installed), and the like. For example, in an exhibition environment in which printed matter is irradiated with illumination, or the like, a luminance value can be obtained by measuring with a luminance meter, or the like. For example, the output D range is obtained by measuring the luminance of a solid black part and paper white of the printed matter and subtracting the solid black luminance from the paper white luminance. Although the above description has been given by taking printed matter as an example, the output D range is similarly required for a display device such as a display apparatus. In the case of a display, for example, a value of a white part may be specified from a luminance value of a backlight, or the like. The various pieces of information may be obtained by an input from a user, or may be obtained from each apparatus.

The input/output D range coefficient k is calculated from the D range of each of the input and the output by the following Equation (1).

$$\text{Input/output } D \text{ range coefficient } k = (\text{output } D \text{ range})/(\text{input } D \text{ range}) \quad \text{Equation (1)}$$

The input/output D range coefficient k is the ratio of the output D range to the input D range and is indicated by the range of 0 to 1. When the input/output D range coefficient k becomes 1 or more, the value is clipped to 1. That is, when the output D range is larger than the input D range, k is 1 or more, and, in this case, k is treated as always being 1.

A contrast correction unit 402 performs a process of correcting contrast that is reduced in a D range compression unit 403. Details of the processing in the contrast correction unit 402 will be described later.

A distance information calculation unit 404 obtains distance information corresponding to the position of each pixel of the input data obtained from the image input unit 400. In order to obtain distance information for each pixel, a method of using a phase difference is given in the present embodiment. In order to obtain phase difference information corresponding to the position of each pixel, configuration is taken such that one pixel is detected by two photodiodes in a sensor (not shown), and pixel values that configure image data are respectively obtained therefrom. As a result, two pieces of image data are obtained. At this time, a phase difference occurs between the two images due to a deviation that is the distance between the photodiodes. By comparing the data, distance information of each pixel can be obtained. In the present embodiment, the more that the phase difference occurs for a pixel, the higher the degree of focus (a state of being in focus), and the smaller the phase difference, the smaller the degree of focus.

Figure 11:
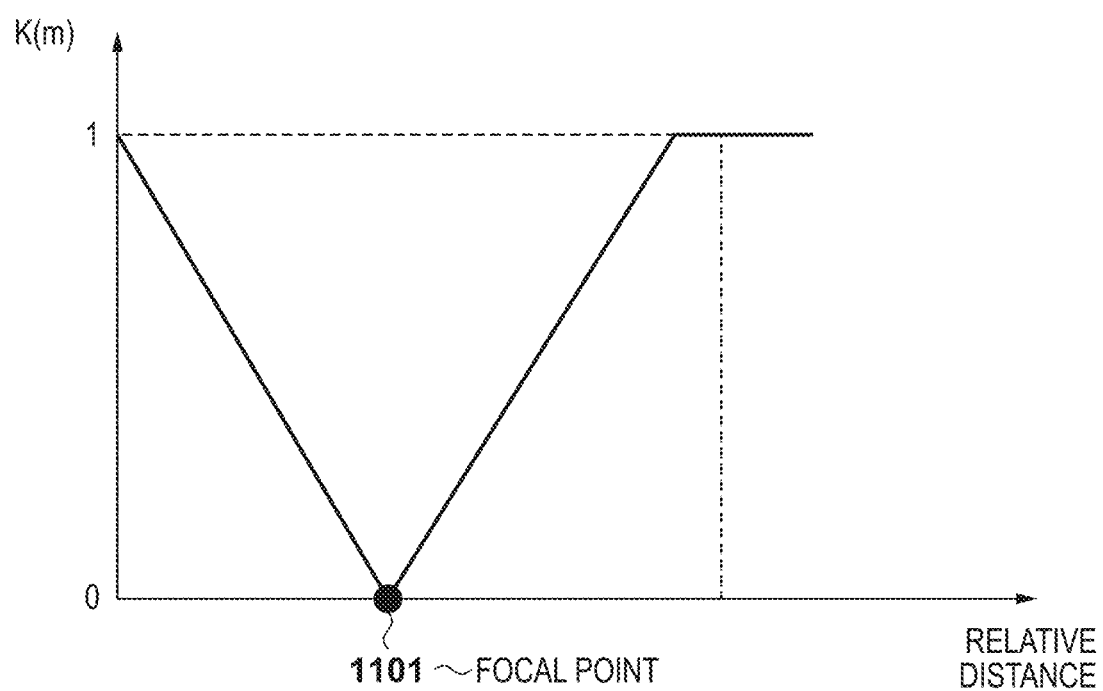
FIG. 11 is a diagram showing distance from a focal point according to an embodiment of the present invention.

Further, in the present embodiment, an image is divided into a plurality of regions, and each region is taken as a unit of processing. Therefore, in each region, distance information obtained in units of pixels is calculated as a representative value of the region. The distance information as the representative value of each region may be calculated by averaging the distance information obtained for each pixel in the region, or method in which a median value is obtained from the distance information of the pixels in the region may be used. Obtained distance information is represented by K(m) (m represents a target region), and data in which K(m) is a value of 0 to 1 is calculated as illustrated in FIG. 11. In FIG. 11, the horizontal axis represents the relative value of the distance between a captured subject and the focal point (focal plane), and the vertical axis represents the distance K(m) associated with the relative distance. It is assumed that K(m) is 0 at the focal point 1101, and approaches 1 as the distance from a focal point 1101 increases. From a predetermined distance, infinity is treated as 1.

The D range compression unit 403 performs D range compression to a predetermined luminance range on inputted data by using means such as a one-dimensional look-up table (hereafter referred to as "1DLUT"). When generating the 1DLUT, the input/output D range coefficient k calculated by the input/output D range calculation unit 401 and the distance information calculated by the distance information calculation unit 404 are used.

Figure 6A:
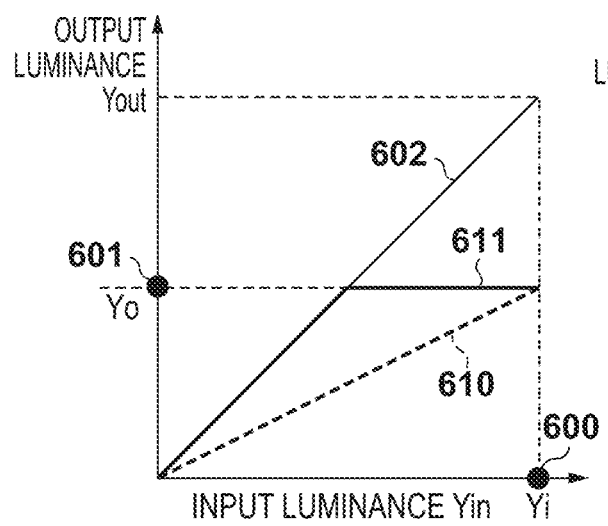
FIGS. 6A and 6B are graphs illustrating a 1DLUT for D range compression according to an embodiment of the present invention.

FIG. 6A shows examples of graphs for generating a 1DLUT according to the present embodiment. In FIG. 6A, the horizontal axis represents an input luminance Yin, and the vertical axis represents an output luminance Yout. Here, it is assumed that the input D range is Yi (a luminance 600 is the upper limit), and the output D range is Yo (a luminance 601 is the upper limit). In the present embodiment, it is assumed that the image is divided and processing is performed for each region, and a 1DLUT is generated for each target region m. A 1DLUT that is to be generated is denoted as LUT(Y, m). LUT(Y, m) is generated based on two tables, R(Y) and A(Y).

In the present example, since the input D range is Yi and the output D range is Yo, the input/output D range coefficient k is calculated by Yo/Yi according to Equation (1). In addition, in FIG. 6A, the table R(Y) indicated by a line 610 and the table A(Y) indicated by a line 611 are calculated by the following Equations (2) and (3), respectively.

$$R(Y) = k \times Y \quad \text{Equation (2)}$$

$$A(Y) = \min(Y, Yo) \quad \text{Equation (3)}$$

Here, min is a function for returning a minimum value from among arguments. In Equation (3), the smaller value of Y and Yo is set to A(Y). R(Y) represents a table without tone loss. In contrast, A(Y) is a table having a region faithful to the luminance of the scene, although there is clip tone loss on the high luminance side. According to Equations (2) and (3), when the output D range Yo is equal to the input D range Yi, both R(Y) and A(Y) have the input/output relationship of a straight line 602, which has linear characteristics.

Next, LUT(Y, m) is calculated based on R(Y), A(Y) and the distance information output from the distance information calculation unit 404. LUT(Y, m) is calculated by the following Equation (4) using K(m) calculated by the distance information calculation unit 404.

$$LUT(Y, m) = K(m) \times A(Y) + (1 - K(m)) \times R(Y) \quad \text{Equation (4)}$$

According to Equation (4), application is such that the weight of the table R(Y) increases the closer a region is to the focal point (focal plane), and the weight of A(Y) increases as the distance from the focal point increases. In other words, a main subject portion that is in focus is subjected to conversion with little tone loss, and regions other than the main subject are subjected to conversion with strong contrast (and faithful to scene luminance) although there is tone loss.

Figure 6B:
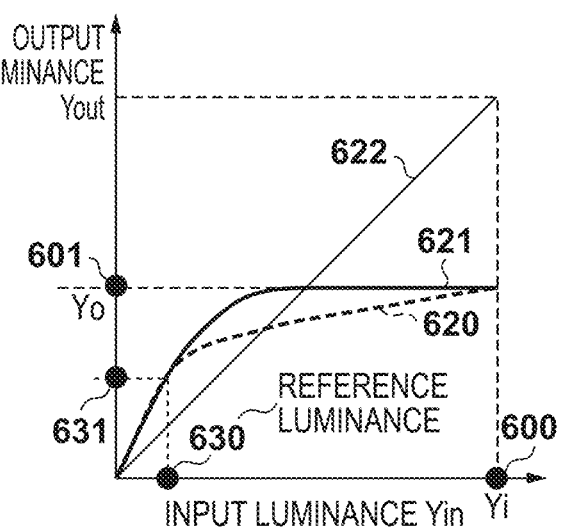

Note that, although R(Y) and A(Y) are obtained by using Equations (2) and (3), there is no limitation thereto, and, for example, a table that maintains up to the reference luminance may be used. FIG. 6B shows an example of such a case. In FIG. 6B, the horizontal axis represents an input luminance Yin, and the vertical axis represents an output luminance Yout. In FIG. 6B, output values from 0 to a reference luminance 630 is the same value for both R(Y) and A(Y), and the output luminance when the reference luminance 630 is inputted is a luminance value 631. In FIG. 6B, when luminance values larger than the reference luminance 630 are inputted, R(Y) and A(Y) have respectively different characteristics. In FIG. 6B, a curve 620 indicates R(Y) and a curve 621 indicates A(Y). Note that a straight line 622 corresponds to the straight line 602 in FIG. 6A.

In the present embodiment, the input D range and the output D range are Yi=1000 nit and Yo=100 nit, respectively. Therefore, HDR image data having the luminance range of 1000 nit is compressed to the luminance range of 100 nit which can be handled by the printer.

Figure 12:
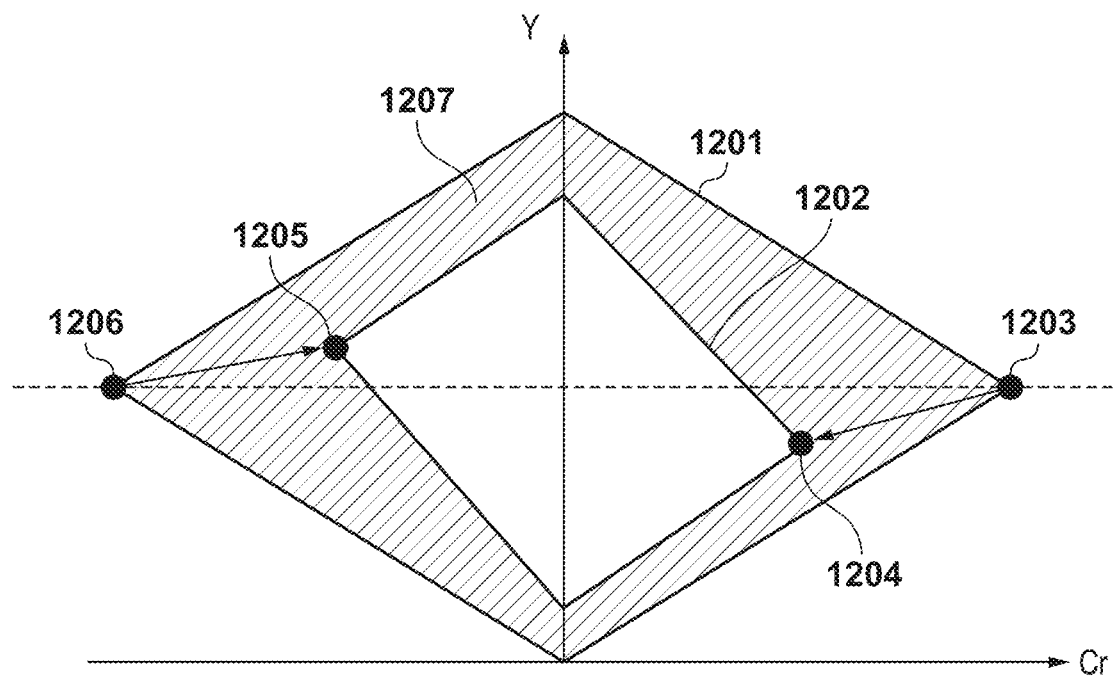
FIG. 12 is a diagram for describing gamut mapping according to an embodiment of the present invention.

A gamut mapping unit 405 performs gamut mapping on a color gamut of a printer by using a method such as a three-dimensional LUT (hereafter referred to as 3DLUT). FIG. 12 is a diagram for describing gamut mapping. In FIG. 12, the horizontal axis represents Cr in the YCbCr color space, and the vertical axis represents a luminance Y. An input color gamut 1201 indicates the color gamut of the D range compressed image data. An output color gamut 1202 indicates a color gamut output in accordance with gamut mapping. Here, it is assumed that the output color gamut 1202 corresponds to the color gamut of the printer 308. Accordingly, the input color gamut 1201 is gamut mapped to the output color gamut 1202, which is the color gamut of the printer 308.

In the present embodiment, if an input color is (Y, Cb, Cr), it is converted into (Y', Cb', Cr'). Primary colors 1203, 1206 of the input color gamut 1201 are mapped to primary colors 1204, 1205 of the output color gamut 1202, respectively. As indicated by a broken line in FIG. 12, the luminance values Y of the primary colors 1203 and 1206 are the same luminance values, but the primary colors 1204 and 1205 after gamut mapping have different luminance values. As described above, when the input/output color gamuts in gamut mapping do not have similar shapes, even the same input luminance value is mapped to a different output luminance value depending on the hue. An outside color gamut region 1207 (difference between the input color gamut 1201 and the output color gamut 1202) represented by hatched lines is a color gamut that cannot be represented by a printer. The outside color gamut region 1207 is compressed and mapped into the output color gamut 1202.

An image output unit 406 performs image processing for output by the printer 308. Image data that has been gamut-mapped by the gamut mapping unit 405 is subjected to color separation for ink colors for when printing is performed by the printer 308. Furthermore, the image output unit 406 performs desired image processing necessary for output by the printer 308, such as quantization processing for making a conversion to binary data that represents whether or not to eject ink, using dithering or error diffusion processing.

(Contrast Correction Unit)

Details of processing in the contrast correction unit 402 according to the present embodiment will be described.

A region division unit 4020 divides an image input by the image input unit 400 into predetermined regions. There are various methods for region division, but, for example, division may be performed with a rectangle having a predetermined pixel size. Specifically, an image having a predetermined number of pixels (a number of horizontal pixels P and a number of vertical pixels Q) is divided by a smaller number of pixels (for example, a number of horizontal pixels X and a number of vertical pixels Y) (P>X, Q>Y).

As another method of region division, a method of categorizing luminance and perform sorting therefrom, or a method of performing division in a color space in addition to dividing color components may be used. In addition, a method of dividing an image according to the content of the image may be used. In addition, a method paired with recognition processing of a specific region, such as face detection, may be used. In the present embodiment, a method of dividing by a rectangle is used to simplify the description.

A color conversion unit 4021 converts input RGB data into luminance and a color difference. In the present embodiment, a color chart system of the converted data will be described with reference to YCbCr. A conversion from RGB to YCbCr is represented by Equations (5) to (7).

$$Y = 0.299 \times R + 0.587 \times G + 0.114 \times B \qquad \text{Equation (5)}$$

$$Cb = -0.1687 \times R - 0.3313 \times G + 0.5 \times B \qquad \text{Equation (6)}$$

$$Cr = 0.5 \times R - 0.4187 \times G - 0.0813 \times B \qquad \text{Equation (7)}$$

Note that the color chart system used in the color conversion unit 4021 is not limited to YCrCb. For example, a CIE L*a*b*(CIELAB) color space representing lightness and color differences, or an HSL color space representing hue, saturation, and lightness may be used. In each color chart system, the lightness (L of Lab or L of HSL) corresponds to the luminance (Y) in YCrCb.

A frequency decomposition unit 4022 performs a frequency decomposition of the luminance component Y of inputted image data into a high-frequency component H and a low-frequency component L. In the present embodiment, the low-frequency component L is generated by performing a filtering process on the luminance component Y. The filtering process will be described with reference to FIG. 7 by taking a Gaussian filter as an example. The filter size represents a size of 5×5, and a coefficient value 701 is set for each pixel. Let the horizontal direction of the image be x, the vertical direction y, the pixel value of the coordinates (x, y) be p(x, y), and the filter coefficient value be f(x, y). Then, the filtering process is performed for each pixel of interest by the method represented by the following Equation (8). The calculation of Equation (8) is performed every time the filter scans image data centering on a pixel of interest 702. When the filter has finished scanning all pixels, a low-frequency component image is obtained (L(x, y)). In Equation (8), the symbol "·" represents a product.

$$L(x,y) = \{1/\Sigma f(x,y)\} \cdot \Sigma \{f(x,y) \times p(x,y)\} \qquad \text{Equation (8)}$$

In the present embodiment, a description is given with an example that the filter characteristic is of a Gaussian type, but there is no limitation to this. For example, an edge preserving filter such as a bilateral filter may be used. The use of an edge preserving filter can reduce a halo of an artifact that occurs in an edge portion when contrast correction is performed.

Assuming that the luminance component is Y, the high-frequency component is H, and the low-frequency component is L for each pixel, the high-frequency component H is calculated by the following Equation (9).

$$L=Y/H \qquad \text{Equation (9)}$$

In the present embodiment, a description is given by assuming that the high-frequency component H and the low-frequency component L of the luminance component Y are the same as a reflected light component R and an illuminating light component Li, respectively.

The illuminating light component can also be generated by performing a filtering process in a similar manner as with the low-frequency component. In addition, if an edge preserving filter is used, the illuminating light component of the edge portion can be generated with higher accuracy. The reflected light component R and the illuminating light component Li can be expressed by the following Equation (10), similarly to Equation (9).

$$R=Y/Li \qquad \text{Equation (10)}$$

The high-frequency component H is generated by dividing the input image by the low-frequency component as represented by Equation (9). However, there is no limitation to this, and the high-frequency component H may be generated by subtracting a low-frequency component from an input image as represented by the following Equation (11).

$$H=Y-L \qquad \text{Equation (11)}$$

A high-frequency component correction unit 4023 performs contrast correction on the high-frequency component H that was decomposed in the frequency decomposition unit 4022, and generates a contrast-corrected high-frequency component Hc. At this time, the high-frequency component correction unit 4023 uses the distance information calculated by the distance information calculation unit 404.

An example of a method for generating Hc will be described. In the above description of the D range compression unit 403, it was described that the table LUT(Y) of the D range compression uses R(Y), which has no tone loss and A(Y), which has a region faithful to the luminance of the scene, although there is clip tone loss on the high luminance side. When the table of R(Y) is used, a so-called low-contrast image in which the slope of a straight line as a conversion characteristic is small and the contrast of the image is insufficient is obtained, as indicated by the line 610 in FIG. 6A. Therefore, by superposing the contrast-corrected high-frequency component Hc obtained here, the high-frequency contrast is maintained, and the occurrence of a low-contrast image is avoided. Here, the contrast of the high-frequency component H included in the HDR image data before the D range conversion is held. That is, letting the high-frequency component to be restored when R(Y) is applied be H1, the following Equation (12) is obtained.

$$H1=H \qquad \text{Equation (12)}$$

In contrast, when A(Y) is applied, as shown in FIG. 6A and FIG. 6B, since there is a saturated region in the high luminance portion, the contrast is approximately restored. That is, it is not necessary to restore up to the contrast H from before the D range conversion. That is, letting the high-frequency component to be restored when A(Y) is applied be H2, the following Equation (13) is obtained.

$$H2=H \times t \qquad \text{Equation (13)}$$

Here, t is a coefficient of 1 or less, and what level of contrast to have is set in advance. Note that, when it is determined that sufficient contrast is obtained by applying A(Y) at the time of a D range conversion, t may be set to "1" (in the case of Equation (16) described later) or "0" (in the case of Equation (17) described later).

The contrast-corrected high-frequency component Hc is calculated by the following Equation (14) using K(m) calculated by the distance information calculation unit 404, similarly with the D range compression unit 403. From Equation (14), the shorter the distance to the focal point (the smaller the value of K(m)), the stronger the influence of H1, and the high-frequency component of the HDR image before conversion is held. Conversely, as the distance from the focal point increases, the high-frequency component of the HDR image before conversion is not retained.

$$Hc=K(m) \times H2+(1-K(m)) \times H1 \qquad \text{Equation (14)}$$

Equation (14) corresponds to Equation (4) described above.

Note that, in the above description, when R(Y) is applied, the contrast of the high-frequency component H included in the HDR image data before D range conversion is retained, but there is no limitation thereto. For example, the high-frequency component H of the HDR image data before D range conversion may be multiplied by a coefficient p, as shown in the following Equation (15). By controlling the value of the coefficient p, for example, it is possible to control the intensity of the contrast according to the application.

$$H1=H \times p \qquad \text{Equation (15)}$$

The coefficient p may be set in advance, or the intensity of the contrast may be changed in accordance with the difference between the D range of the input and the output by using the input/output D range coefficient of the input and the output.

An image combining unit 4024 combines the contrast-corrected high-frequency component Hc output from the high-frequency component correction unit 4023 and a compressed low-frequency component L' output from the D range compression unit 403. Further, the image combining unit 4024 combines the color difference components (Cb and Cr) outputted from the color conversion unit 4021 to generate a color image. The equation used for the combining is represented by the following Equation (16). In Equation (16), by multiplying the high-frequency component Hc and the compressed low-frequency component L', a luminance image Yc in which the frequency components are combined is obtained.

$$Yc=Hc \times L' \qquad \text{Equation (16)}$$

In a case when the frequency decomposition unit 4022 generates the high-frequency component H by using Equation (11), the luminance image Yc can be calculated by the following Equation (17).

$$Yc=Hc+L' \qquad \text{Equation (17)}$$

Then, the image combining unit 4024 combines the luminance image Yc and the color difference components (Cb, Cr) to generate a color image (Yc, Cb, Cr).

Figures 7, 8:
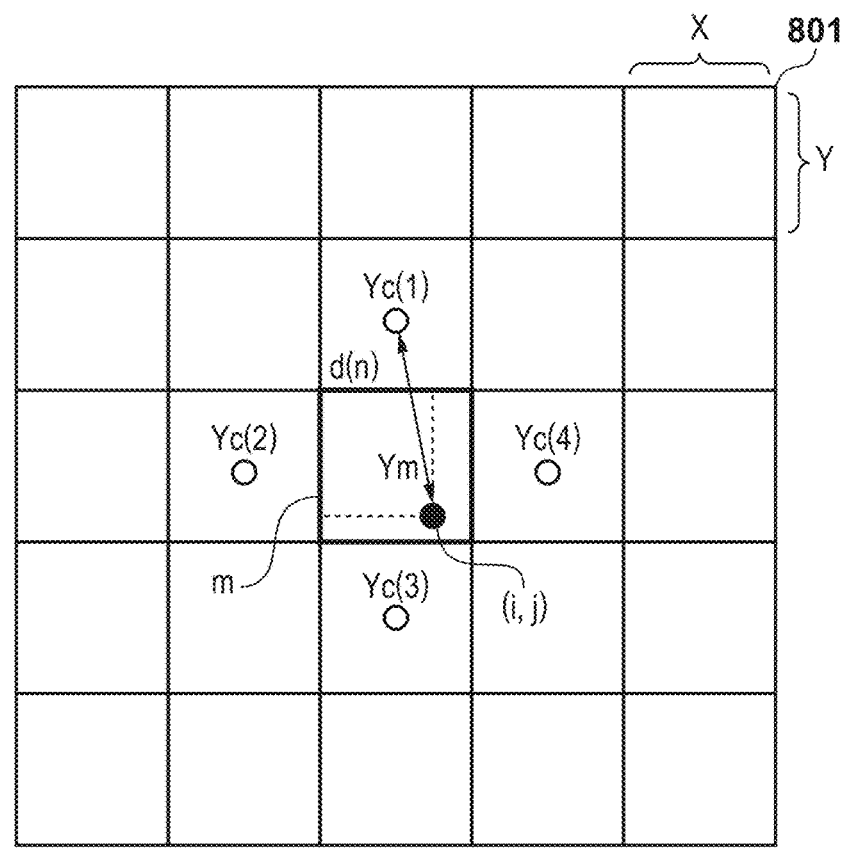
FIG. 7 is a diagram showing an example of a filter for generating a low-frequency component according to an embodiment of the present invention.
FIG. 8 is a diagram for describing a region matching unit according to an embodiment of the present invention.

With respect to the result of the image combining performed by the image combining unit 4024, a region matching unit 4025 makes each region match with the surrounding regions thereof. FIG. 8 is a diagram for describing region matching according to the present embodiment. In FIG. 8, a rectangle 801 represents one region, and the size of each region is X pixels×Y pixels. The luminance value of the pixel at the position (i, j) in the target region m is denoted by Ym(i, j), and the representative luminance value of the four regions n above, below, left, and right of the target region m is denoted by Yc(n). Here, as the representative luminance value Yc, the average luminance of the target region is used, but there is no limitation to this. In addition, it is assumed that n represents any one of 1 to 4, and in the relative relationship with the target region m, it means 1:above, 2:left, 3:below, and 4:right. When the distance between a representative point (here, a centroid) of the surrounding region n and a pixel position (i, j) is d(n), Ym(i, j) is calculated by the following Equation (18).

$$Y_m(i, j) = \sum_{n=1}^{4}\sum_{j}^{Y}\sum_{i\setminus X} \frac{\exp(-d(n) * Y_c(n))}{\exp(-d(n))}$$ Equation (18)

By using Equation (18), it is possible to secure consistency with the surrounding regions of the D range compression processing and the contrast correction processing performed for each region, and it is possible to avoid occurrence of an image defect due to a particular region. That is, the pixel value of the region of interest is corrected based on the value of adjacent regions (surrounding regions n) that are adjacent to the pixel of interest.

[Process Flow]

Figure 9:
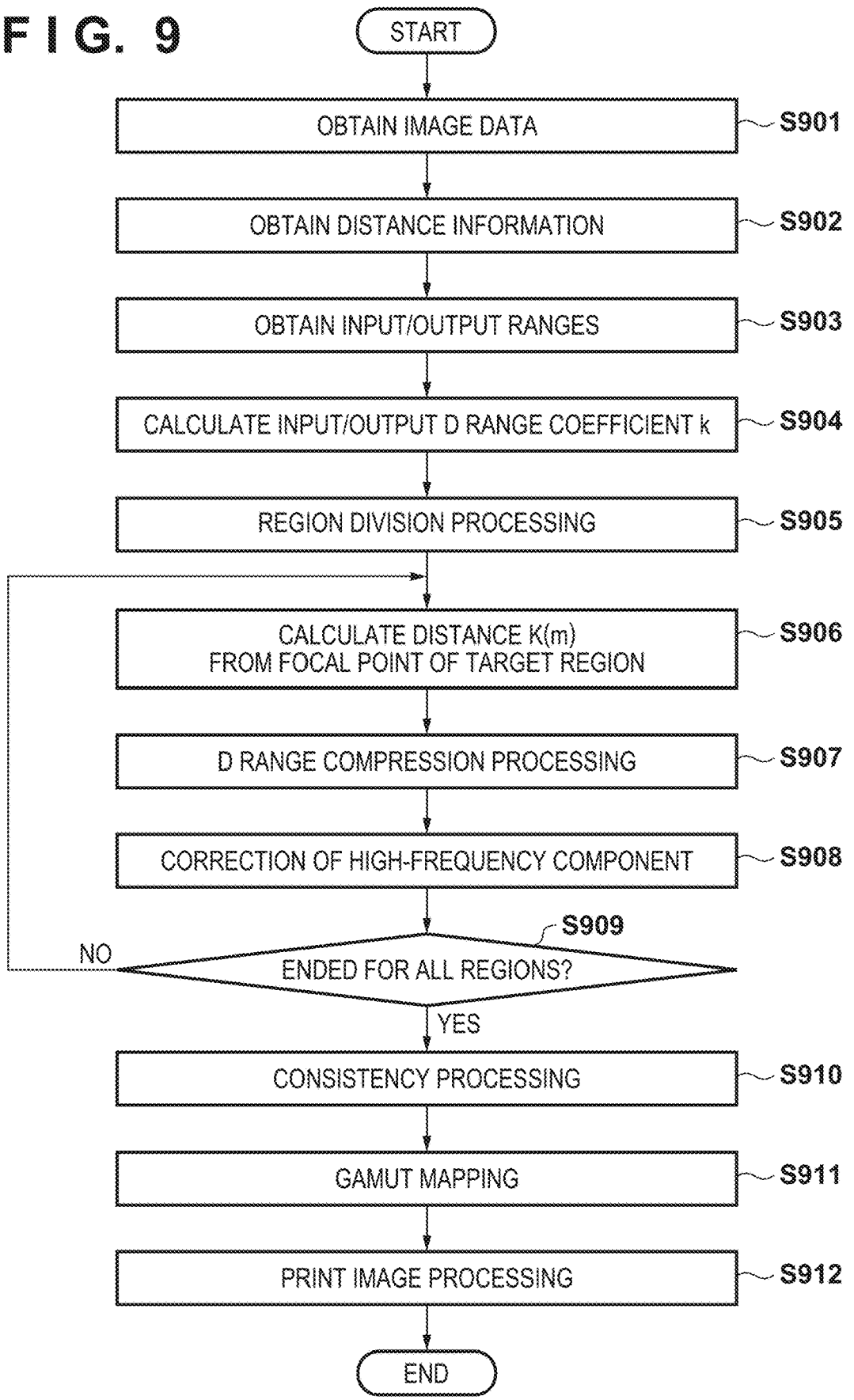
FIG. 9 is a diagram showing a processing flow according to an embodiment of the present invention.

FIG. 9 shows a flowchart of processing according to the present embodiment. This processing flow is realized, for example, by the CPU 302 of the image processing apparatus 301 reading and executing programs stored in the HDD 304, or the like. Note that the details of the processing in each step of FIG. 9 correspond to the processing described with reference to FIG. 4. In addition, the order of each step does not necessarily need to be that shown in FIG. 9, and parts thereof may be switched.

In step S901, the image processing apparatus 301 obtains target image data in accordance with the image input unit 400.

In step S902, the distance information calculation unit 404 of the image processing apparatus 301 calculates distance information based on the phase difference data accompanying the image data.

In step S903, the input/output D range calculation unit 401 of the image processing apparatus 301 obtains input/output D range information from the image data obtained in step S901 and the output information of the printer 308.

In step S904, the image processing apparatus 301 uses the input/output D range calculation unit 401 to calculate the input/output D range coefficient k from the obtained input/output D range information.

In step S905, the image processing apparatus 301 performs region division processing in accordance with the region division unit 4020, and divides the image into a plurality of regions.

In step S906, the distance information calculation unit 404 of the image processing apparatus 301 calculates the distance K(m) from the focal point of a target region m using the distance information obtained in step S902.

In step S907, the D range compression unit 403 of the image processing apparatus 301 performs D range compression processing based on the input/output D range coefficient k calculated in step S904 and the distance K(m) calculated in step S906.

In step S908, the image processing apparatus 301 performs high-frequency component correction processing in accordance with the color conversion unit 4021, the frequency decomposition unit 4022, and the high-frequency component correction unit 4023, and performs contrast processing suitable for the image.

In step S909, the image processing apparatus 301 determines whether or not the processing has ended for all the regions that were obtained by the region division. When it is determined that the processing has not ended (NO in step S909), the processing proceeds to S906, and the processing is repeated with the unprocessed region as the target region. If it is determined that the processing has ended for all the regions (YES in step S909), the processing proceeds to S910.

In step S910, the image processing apparatus 301 performs region consistency processing in accordance with the image combining unit 4024 and the region matching unit 4025.

In step S911, the gamut mapping unit 405 of the image processing apparatus 301 performs gamut mapping processing on the image data that is outputted from the contrast correction unit 402 and for which the consistency processing has ended.

In step S912, the image processing apparatus 301, in accordance with the image output unit 406, executes various image processing required for printing in the printer 308. Then, this processing flow ends.

Figure 10A:
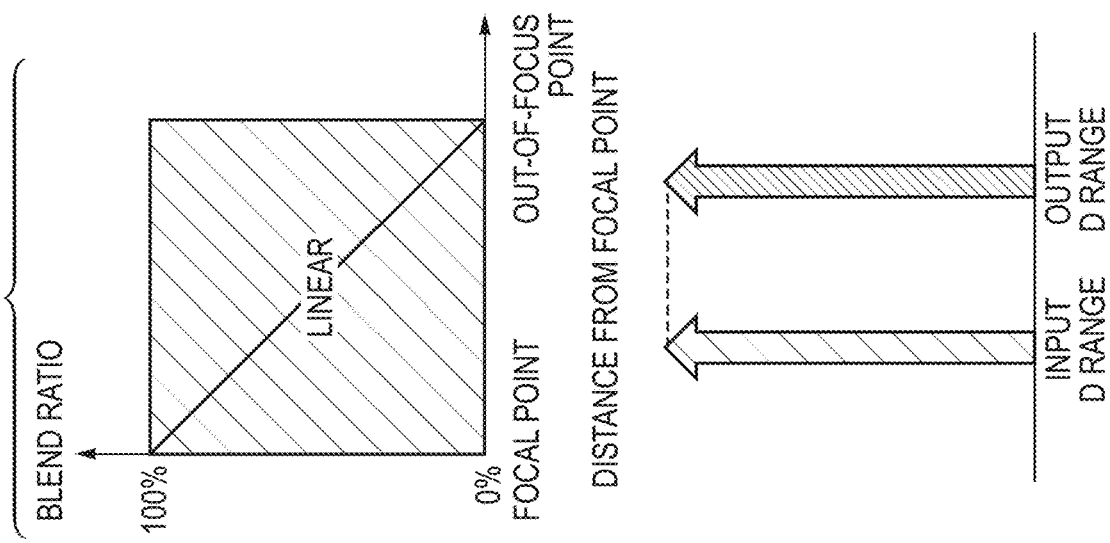
FIGS. 10A, 10B, and 10C are views graphing processing results according to an embodiment of the present invention.
Figure 10B:
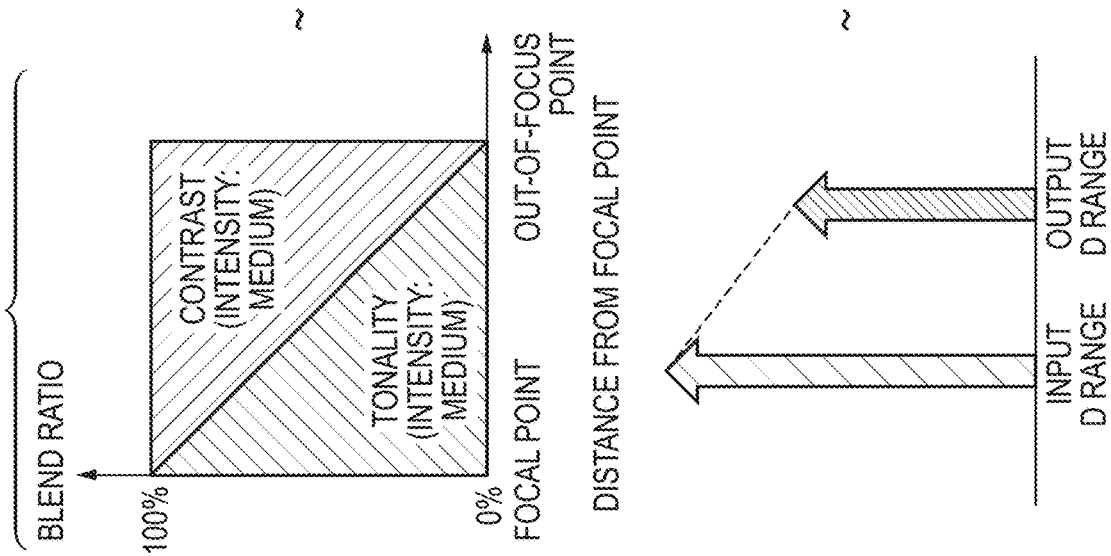
Figure 10C:
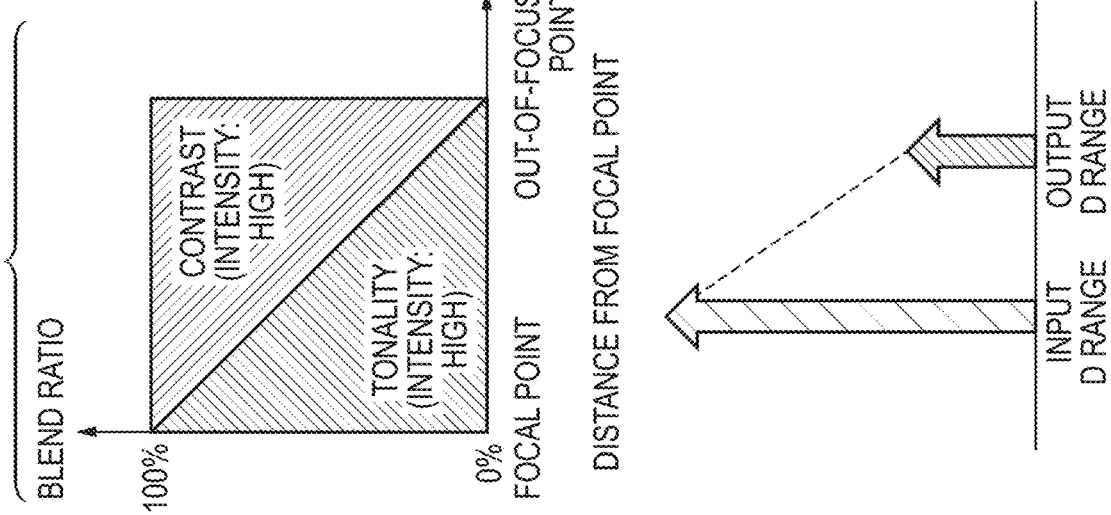

FIGS. 10A to 10C are views for describing examples of results obtained by the above processing. FIGS. 10A to 10C respectively represent the case when the input D range is greater than the output D range, the case when the input D range is slightly greater than the output D range, and the case when the input D range and the output D range are the same.

In FIGS. 10A to 10C, in the upper graph, the horizontal axis represents the distance from the focal point of the region, and the vertical axis represents a blend ratio of contrast and tonality. The blend ratio indicates the ratio of application of the conversion based on K, as shown by Equations (4) and (14). Contrast here means that a 1DLUT having strong contrast correction in accordance with A(Y) described above is applied. Tonality here means that the tonality without overexposure is maintained by applying the above-mentioned 1DLUT of R(Y) and further superposing a high-frequency component from before compression. Therefore, as shown in Equation (4) and Equation (14), in the in-focus region of the image, reproduction with more tonality is performed, and as the distance from the focal point increases, a strong contrast with overexposure is applied to the highlight.

As shown in FIG. 10A and FIG. 10B, the greater the D range of the input than that of the output, that is the bigger the range difference between the input and the output, the stronger the respective processing intensity. In contrast, as the range difference decreases, the intensity of the processing weakens. Further, as shown in FIG. 10C, when the D range of the input and the output are the same, the D range is not converted, and a variation that acts in harmony with the contrast and corresponds to the distance information of the region with respect to the focal plane does not occur.

Therefore, in accordance with the present embodiment, when converting from an input D range to an output D range, it is possible to output an image having a high contrast with respect to a bokeh region while being able to restore the tonality of a main subject portion that is in focus in the image.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
    a division unit configured to divide first image data having a first dynamic range into a plurality of regions;
    an obtaining unit configured to obtain distance information indicating a distance from a focal plane in each of the plurality of regions;
    a determining unit configured to determine a conversion characteristic of each of the plurality of regions based on the distance information;
    a conversion unit configured to convert each of the plurality of regions into second image data having a second dynamic range smaller than the first dynamic range by using the conversion characteristic determined by the determining unit; and
    a storage unit configured to store a first conversion characteristic and a second conversion characteristic that can be used for the conversion,
    wherein, in relation to input luminance and output luminance, the first conversion characteristic has a higher characteristic of maintaining tone than the second conversion characteristic, and has a lower characteristic of maintaining contrast than the second conversion characteristic,
    wherein, with respect to a first region whose distance from the focal plane indicated by the distance information is a first distance, the determining unit applies the first conversion characteristic at a first level, and applies the second conversion characteristic at a second level, and
    wherein with respect to a second region separated from the focal plane indicated by the distance information by a second distance longer than the first distance, the determining unit applies the first conversion characteristic at a level lower than the first level, and applies the second conversion characteristic at a level higher than the second level.

2. The image processing apparatus according to claim 1, wherein the smaller the difference between the first dynamic range and the second dynamic range, the smaller an intensity of processing that is based on each of the first conversion characteristic and the second conversion characteristic and that is weighted based on the distance information.

3. The image processing apparatus according to claim 1, further comprising:
    a correction unit configured to correct the second image data converted by the conversion unit,
    wherein the correction unit performs correction by superposing a predetermined frequency component based on the first image data on the second image data.

4. The image processing apparatus according to claim 3, wherein the correction unit determines the predetermined frequency component such that a weight of a first high-frequency component, which is equivalent to the high-frequency component of the first image data, increases as the distance from the focal plane in the distance information decreases, and such that a weight of a second high-frequency component, which is obtained by reducing a predetermined ratio with respect to the first high-frequency component, increases as the distance from the focal plane increases.

5. The image processing apparatus according to claim 1, further comprising:
    a combining unit configured to combine the plurality of regions converted by the conversion unit,
    wherein the combining unit corrects a pixel value of a region of interest among the plurality of regions based on a pixel value of an adjacent region adjacent to the region of interest.

6. The image processing apparatus according to claim 1, wherein the first conversion characteristic is determined based on a ratio of the second dynamic range with respect to the first dynamic range.

7. The image processing apparatus according to claim 1, wherein
    the first dynamic range is specified on the basis of at least one of the characteristics of an image capturing apparatus that captured the first image data and conditions at a time of capturing, and
    the second dynamic range is specified based on the characteristic of an output apparatus for outputting the second image data and/or information of a viewing environment in a case when the output apparatus outputs the second image data.

8. An image processing method comprising:
    dividing first image data having a first dynamic range into a plurality of regions;
    obtaining distance information indicating a distance from a focal plane in each of the plurality of regions;
    determining a conversion characteristic of each of the plurality of regions based on the distance information;
    converting each of the plurality of regions into second image data having a second dynamic range smaller than the first dynamic range by using the determined conversion characteristic,
    wherein a first conversion characteristic and a second conversion characteristic are used in the conversion,
    wherein, in relation to input luminance and output luminance, the first conversion characteristic has a higher characteristic of maintaining tone than the second conversion characteristic, and has a lower characteristic of maintaining contrast than the second conversion characteristic, wherein, in the determining, with respect to a first region whose distance from the focal plane indicated by the distance information is a first distance, the first conversion characteristic is applied at a first level, and the second conversion characteristic is applied at a second level, and wherein, in the determining, with respect to a second region separated from the focal plane indicated by the distance information by a second distance longer than the first distance, the first conversion characteristic is applied at a level lower than the first level, and the second conversion characteristic is applied at a level higher than the second level.

9. The image processing method according to claim 8, wherein the smaller the difference between the first dynamic range and the second dynamic range, the smaller an intensity of processing that is based on each of the first conversion characteristic and the second conversion characteristic and that is weighted based on the distance information.

10. The image processing method according to claim 8, further comprising:

correcting the second image data converted, wherein correction is performed by superposing a predetermined frequency component based on the first image data on the second image data.

11. The image processing method according to claim 10, wherein the predetermined frequency component is determined such that a weight of a first high-frequency component, which is equivalent to the high-frequency component of the first image data, increases as the distance from the focal plane in the distance information decreases, and such that a weight of a second high-frequency component, which is obtained by reducing a predetermined ratio with respect to the first high-frequency component, increases as the distance from the focal plane increases.

12. The image processing method according to claim 8, further comprising:

combining the plurality of regions converted, wherein a pixel value of a region of interest among the plurality of regions is corrected based on a pixel value of an adjacent region adjacent to the region of interest.

13. The image processing method according to claim 8, wherein the first conversion characteristic is determined based on a ratio of the second dynamic range with respect to the first dynamic range.

14. The image processing method according to claim 8, wherein the first dynamic range is specified on the basis of at least one of the characteristics of an image capturing apparatus that captured the first image data and conditions at a time of capturing, and the second dynamic range is specified based on at least one of the characteristic of an output apparatus for outputting the second image data and information of a viewing environment in a case when the output apparatus outputs the second image data.

15. A non-transitory computer-readable storage medium storing a program for causing a computer to function as:

a division unit configured to divide first image data having a first dynamic range into a plurality of regions;

an obtaining unit configured to obtain distance information indicating a distance from a focal plane in each of the plurality of regions;

a determining unit configured to determine a conversion characteristic of each of the plurality of regions based on the distance information;

a conversion unit configured to convert each of the plurality of regions into second image data having a second dynamic range smaller than the first dynamic range by using the conversion characteristic determined by the determining unit; and a storage unit configured to store a first conversion characteristic and a second conversion characteristic that can be used for the conversion, wherein, in relation to input luminance and output luminance, the first conversion characteristic has a higher characteristic of maintaining tone than the second conversion characteristic, and has a lower characteristic of maintaining contrast than the second conversion characteristic, wherein, with respect to a first region whose distance from the focal plane indicated by the distance information is a first distance, the determining unit applies the first conversion characteristic at a first level, and applies the second conversion characteristic at a second level, and wherein, with respect to a second region separated from the focal plane indicated by the distance information by a second distance longer than the first distance, the determining unit applies the first conversion characteristic at a level lower than the first level, and applies the second conversion characteristic at a level higher than the second level.

* * * * *